United States Patent
Choi

(10) Patent No.: US 10,135,866 B2
(45) Date of Patent: Nov. 20, 2018

(54) METHOD OF PREVENTING DRIVE-BY HACKING, AND APPARATUS AND SYSTEM THEREFOR

(71) Applicant: HYUNDAI MOTOR COMPANY, Seoul (KR)

(72) Inventor: Hyeon Taek Choi, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 157 days.

(21) Appl. No.: 15/095,735

(22) Filed: Apr. 11, 2016

(65) Prior Publication Data

US 2017/0155679 A1 Jun. 1, 2017

(30) Foreign Application Priority Data

Nov. 27, 2015 (KR) .................. 10-2015-0166960

(51) Int. Cl.
| | |
|---|---|
| *H04L 29/06* | (2006.01) |
| *H04W 4/80* | (2018.01) |
| *G06F 3/06* | (2006.01) |
| *H04L 29/08* | (2006.01) |
| *H04W 84/12* | (2009.01) |
| *B60W 10/00* | (2006.01) |

(52) U.S. Cl.
CPC ......... *H04L 63/1466* (2013.01); *B60W 10/00* (2013.01); *G06F 3/065* (2013.01); *G06F 3/067* (2013.01); *G06F 3/0623* (2013.01); *H04L 63/1416* (2013.01); *H04L 67/1097* (2013.01); *H04L 67/12* (2013.01); *H04W 4/80* (2018.02); *H04W 84/12* (2013.01)

(58) Field of Classification Search
CPC ........................ H04L 63/1466; G06F 3/0623

USPC .................................................... 726/22–25
See application file for complete search history.

(56) References Cited

U.S. PATENT DOCUMENTS

| | | | | |
|---|---|---|---|---|
| 2013/0124917 A1* | 5/2013 | Das | ............... | G06F 11/1438 714/6.12 |
| 2015/0172306 A1* | 6/2015 | Kim | ............... | H04L 63/1425 726/23 |
| 2015/0215125 A1* | 7/2015 | Park | ............... | H04L 63/1466 380/255 |

FOREIGN PATENT DOCUMENTS

| | | |
|---|---|---|
| KR | 10-2005-0022928 A | 3/2005 |
| KR | 10-2006-0054669 A | 5/2006 |

(Continued)

OTHER PUBLICATIONS

Korean Office Action dated Sep. 28, 2016, issued in Korean Patent Application No. 10-2015-0166960.

*Primary Examiner* — Anthony Brown
(74) *Attorney, Agent, or Firm* — McDermott Will & Emery LLP

(57) ABSTRACT

The present disclosure relates to a method of preventing drive-by hacking, and an apparatus and a system therefor. A method of preventing drive-by hacking in a vehicle system linked with a vehicle head unit through a communication network in a vehicle may include receiving a predetermined external terminal access notification message reporting access by an external terminal from the vehicle head unit, verifying whether fixed data recorded in an application memory is consistent with fixed data recorded in a backup memory, and transmitting a predetermined hacking detection message to the vehicle head unit based on a result of verification. Therefore, the present disclosure has an advantage of strengthening security of a vehicle when an external terminal is linked with a vehicle head unit.

18 Claims, 6 Drawing Sheets

(56) References Cited

FOREIGN PATENT DOCUMENTS

| | | | |
|---|---|---|---|
| KR | 10-2006-0135757 | A | 12/2006 |
| KR | 10-2013-0068562 | A | 6/2013 |
| KR | 10-1446525 | B1 | 10/2014 |
| KR | 10-2014-0146718 | A | 12/2014 |
| KR | 10-1472896 | B1 | 12/2014 |
| KR | 10-2015-0075996 | A | 7/2015 |
| KR | 10-1550638 | B1 | 9/2015 |
| KR | 10-1558383 | B1 | 10/2015 |

* cited by examiner

FIG. 5

AREA IN WHICH FIXED CALIBRATION DATA IS RECORDED IN BACKUP MEMORY — 510

| Address | Byte 7 | Byte 6 | Byte 5 | Byte 4 | Byte 3 | Byte 2 | Byte 1 | Byte 0 |
|---|---|---|---|---|---|---|---|---|
| 0x0000 | 1 | 7 | 4 | 3 | 2 | 2 | 1 | 1 |
| 0x0008 | 0 | 4 | 5 | 7 | 8 | 1 | 4 | 3 |
| 0x0010 | 7 | 1 | 3 | 4 | 2 | 2 | 1 | 5 |
| 0x0018 | 1 | 0 | 0 | 0 | 0 | 0 | 0 | 0 |
| 0x0020 | 0 | 0 | 0 | 0 | 0 | 0 | 0 | 1 |

511, 512, 513

AREA IN WHICH FIXED CALIBRATION DATA IS RECORDED IN APPLICATION MEMORY — 520

| Address | Byte 7 | Byte 6 | Byte 5 | Byte 4 | Byte 3 | Byte 2 | Byte 1 | Byte 0 |
|---|---|---|---|---|---|---|---|---|
| 0x0000 | 1 | 4 | 7 | 3 | 9 | 2 | 1 | 1 |
| 0x0008 | 0 | 4 | 5 | 7 | 8 | 1 | 4 | 3 |
| 0x0010 | 7 | 1 | 3 | 4 | 2 | 2 | 1 | 5 |
| 0x0018 | 1 | 0 | 0 | 0 | 0 | 0 | 0 | 0 |

521, 522

METHOD OF PREVENTING DRIVE-BY HACKING, AND APPARATUS AND SYSTEM THEREFOR

CROSS-REFERENCE TO RELATED APPLICATION

This application claims the benefit of Korean Patent Application No. 10-2015-0166960, filed on Nov. 27, 2015, which is hereby incorporated by reference as if fully set forth herein.

TECHNICAL FIELD

The present disclosure relates to a technology for preventing hacking into a vehicle when an external device is linked with the vehicle, and more particularly, to a method of preventing drive-by hacking capable of preventing a system installed in a vehicle from being hacked through an external device connected to a vehicle head unit or a vehicle gateway, and an apparatus and system therefor.

BACKGROUND

Various technologies have recently been developed to link an external terminal (or external device), for example, a smartphone with a vehicle head unit installed in a vehicle.

Currently, an external smart device has been connected to a vehicle head unit through near field communication such as Bluetooth communication, Wi-Fi communication, etc. In addition, some vehicle head units include mobile communication modules, and thus may be linked through a mobile communication network with an external telematics server.

For example, a smartphone manufacturer, Apple, and an Android OS provider, Google, have recently launched CarPlay and Google Android Auto, respectively, corresponding to individual standards. As a result, a user can use a display of a vehicle head unit through a second display of a smartphone by connecting the smartphone, which runs iOS or Android OS, to the vehicle head unit wirelessly or by wire.

In addition, MirrorLink led by the Car Connective Consortium has been gradually extended by several original equipment manufacturers (OEMs). In China, a function of linking a vehicle AVN system and a smartphone, which has been independently standardized by leading information technology (IT) companies such as Baidu, Tencent, etc., has been developed.

A function of linking a smartphone and a vehicle head unit allows various applications of the smartphone to be conveniently used in the vehicle, allows applications suitable for the vehicle to be distributed through the ecosystem previously constructed by Apple/Google/Baidu, etc., and allows the applications to be frequently updated. Thus, it is possible to effectively overcome problems of the absence of the ecosystem, restriction on upgrade and connection, etc. that a conventional vehicle has had. Therefore, the function of linking the vehicle head unit and the smartphone is expected to be a technology that can enhance marketability of the vehicle head unit which can lag behind a conventional IT product.

Moreover, a recently released vehicle and smartphone support a vehicle-dedicated data channel for transmitting and receiving various types of vehicle-related control information and various types of information obtainable from the vehicle, for example, driving information, fuel efficiency information, breakdown information, etc.

Control instructions and data contained in a packet transmitted and received through the vehicle-dedicated data channel include information and control instructions that threaten vehicle security. Thus, when the information is leaked or changed, the leaked or changed information may have a fatal effect on safe driving. Therefore, it is important to detect and prevent hacking into vehicle security data when the smartphone is linked with the vehicle head unit.

More seriously, when code is counterfeited or falsified by a malicious hacker in a process of distributing SW of Apple/Google, etc., code having a potential security risk may be installed in the smartphone, and thus vehicle security risk may increase.

As illustrated in FIG. 1, according to a current technology of linking a smartphone and a vehicle head unit, the smartphone and the vehicle head unit are connected to each other using a physical communication means such as a universal serial bus (USB)/Wi-Fi/Bluetooth/ZigBee, etc., and the vehicle head unit decodes and renders received data such as video or audio to output the data using an included output means when the smartphone transmits the data. In addition, the vehicle head unit may transmit, to the smartphone, input data input through an included input means such as a touch screen, a key button, etc., audio data for voice recognition, handoff, etc., positioning data acquired through a global positioning system (GPS) module included in the vehicle head unit, etc. In addition, the vehicle head unit may establish a vehicle-dedicated data channel with a particular vehicle-dedicated application included in the smartphone to transmit and receive various types of vehicle control information and state information through the established vehicle-dedicated data channel. For example, the vehicle head unit may transmit breakdown information, driving information, fuel efficiency information, etc. collected from various controllers in a vehicle to the smartphone through the vehicle-dedicated data channel, and the smartphone may transmit various control instructions for collection of vehicle information and various control instructions for control of an operation of the vehicle such as emergency braking to the vehicle head unit through the vehicle-dedicated data channel.

In general, a vehicle head unit is used in a physically controlled environment. In addition, the vehicle head unit is not continuously connected to a network, or software and firmware in the vehicle head unit are not constantly updated by a user. Thus, security risk of the vehicle head unit is low when compared to a smartphone.

On the other hand, the smartphone is continuously connected to the network, and thus is continuously exposed to malicious hacking from outside. Thus, software having malicious code may be installed.

When the smartphone is hacked, a hacker may remotely control the smartphone to transmit a control instruction of emergency braking, a random operation of a steering wheel, etc. to a vehicle, thereby causing a serious problem in vehicle security.

SUMMARY

Accordingly, the present disclosure is directed to a method of preventing drive-by hacking, and an apparatus and system therefor that substantially obviate one or more problems due to limitations and disadvantages of the related art.

An object of the present disclosure is to provide a method and apparatus for preventing hacking into an engine management system (EMS) when an external terminal is linked with a vehicle head unit. Here, the method and apparatus may detect whether hacking into the EMS occurs by periodically comparing fixed calibration data recorded in an application memory area used by an application layer of an EMS controller with fixed calibration data recorded in a backup memory area inaccessible by the external terminal when the external terminal is linked with the vehicle head unit.

Another object of the present disclosure is to provide a method and apparatus for preventing hacking into an EMS when an external terminal is linked with a vehicle head unit. Here, the method and apparatus may detect whether hacking into the EMS occurs by comparing a communication message in a vehicle received by an application layer of an EMS controller with standard information of a particular field value of the message retained in a backup memory area in real time when the external terminal is linked with the vehicle head unit.

Technical problems to be solved by the present disclosure are not limited to the above-mentioned technical problems, and other technical problems not mentioned herein may be clearly understood by those skilled in the art from description below.

The present disclosure provides a method and apparatus for providing EMS security when an external terminal is linked with a vehicle head unit.

To achieve these objects and other advantages and in accordance with the purpose of the disclosure, as embodied and broadly described herein, a method of preventing drive-by hacking in a vehicle system linked with a vehicle head unit through a communication network in a vehicle, includes receiving a predetermined external terminal access notification message reporting access by an external terminal from the vehicle head unit, verifying whether fixed data recorded in an application memory is consistent with fixed data recorded in a backup memory, and transmitting a predetermined hacking detection message to the vehicle head unit based on a result of verification.

The verifying may include copying the fixed data recorded in the application memory to the backup memory, and verifying whether the fixed data recorded in the application memory is consistent with the fixed data recorded in the backup memory at predetermined intervals, wherein the hacking detection message is transmitted to the vehicle head unit when the fixed data recorded in the application memory is inconsistent with the fixed data recorded in the backup memory a number of times reaching a predetermined threshold value.

The fixed data may include at least one of fixed calibration data and fixed controller area network (CAN) communication data.

The fixed calibration data may include at least one of torque-related calibration parameter setting information, idle revolutions per minute (RPM) mapping table information, accelerator pedal sensor (APS) setting table information, and brake pedal sensor (BPS) setting table information.

A communication channel established between the external terminal and the vehicle may be canceled when the hacking detection message is transmitted to the vehicle head unit.

The communication network in the vehicle may correspond to one of a CAN communication network, a local interconnect network (LIN) communication network, a FlexRay communication network, and an Ethernet communication network.

The vehicle system may correspond to one of an engine management system (EMS), a telecommunication control unit (TCU), a hybrid control unit (HCU), a battery management system (BMS), electronic power steering (EPS), motor driven power steering (MDPS), a lane keeping assist system (LKAS), smart cruise control (SCC), and a tire pressure management system (TPMS).

In another aspect of the present disclosure, a method of preventing drive-by hacking in a vehicle system linked with a vehicle gateway through a communication network in a vehicle, includes receiving a predetermined external terminal access notification message reporting access by an external terminal from the vehicle gateway, verifying whether fixed data recorded in an application memory is consistent with fixed data recorded in a backup memory, and transmitting a predetermined hacking detection message to the vehicle gateway based on a result of verification.

In another aspect of the present disclosure, an apparatus for preventing drive-by hacking linked with an external terminal through a communication network in a vehicle, includes a control unit for receiving a predetermined external terminal access notification message reporting access by an external terminal, an application memory wherein fixed data processed by the control unit is recorded, a backup memory wherein a copy of the fixed data is recorded, access by the control unit to the backup memory being interrupted, and a hacking interruption unit for verifying whether the fixed data recorded in the application memory is consistent with the fixed data recorded in the backup memory, wherein the control unit performs a control operation such that communication with the external terminal is interrupted when hacking is detected based on a result of verification.

The hacking interruption unit may copy the fixed data recorded in the application memory to the backup memory according to control of the control unit, and verify whether the fixed data recorded in the application memory is consistent with the fixed data recorded in the backup memory at predetermined intervals, wherein the hacking interruption unit may determine that hacking occurs and transmit a predetermined hacking detection message to the control unit when the fixed data recorded in the application memory is inconsistent with the fixed data recorded in the backup memory a number of times reaching a predetermined threshold value.

The fixed data may include at least one of fixed calibration data and fixed CAN communication data.

The fixed calibration data may include at least one of torque-related calibration parameter setting information, idle RPM mapping table information, APS setting table information, and BPS setting table information.

A communication channel established between the external terminal and the vehicle may be canceled when the hacking detection message is transmitted to the vehicle head unit.

The communication network in the vehicle may correspond to one of a CAN communication network, a LIN communication network, a FlexRay communication network, and an Ethernet communication network.

The apparatus for preventing drive-by hacking may be installed in one of an EMS, a TCU, an HCU, a BMS, an EPS, an MDPS, an LKAS, an SCC, and a TPMS.

In another aspect of the present disclosure, a system for preventing drive-by hacking includes a vehicle head unit for transmitting a predetermined external terminal access notification message reporting access by an external terminal through a CAN communication network in response to the access by the external terminal, and a vehicle controller for copying fixed data recorded in an application memory to a backup memory when the external terminal access notification message is received, and transmitting a predetermined hacking detection message to the vehicle head unit when hacking is detected by verifying that the fixed data recorded in the application memory is inconsistent with the fixed data in the backup memory at predetermined intervals, wherein the vehicle head unit cancels a communication channel established with the external terminal when the hacking detection message is received.

In another aspect of the present disclosure, it is possible to provide a computer-readable recording medium recording a program for executing any one of the above-described methods of preventing drive-by hacking.

It should be noted that the above-mentioned technical solutions are merely a part of embodiments of the present disclosure, and various embodiments reflecting technical characteristics of the present disclosure may be derived and understood by those skilled in the art from detailed description of the present disclosure given below.

BRIEF DESCRIPTION OF THE DRAWINGS

The accompanying drawings are included to provide a further understanding of the invention and provide embodiments of the present invention together with the detailed description. However, a technical characteristic of the invention is not restricted to a particular drawing, and characteristics disclosed in the respective drawings may be combined and configured as a new embodiment.

FIG. 5 is a diagram for description of a method of detecting hacking through comparison between memories in a hacking interruption unit of an EMS controller according to an embodiment of the present disclosure.

DETAILED DESCRIPTION OF THE DISCLOSURE

Figure 1:
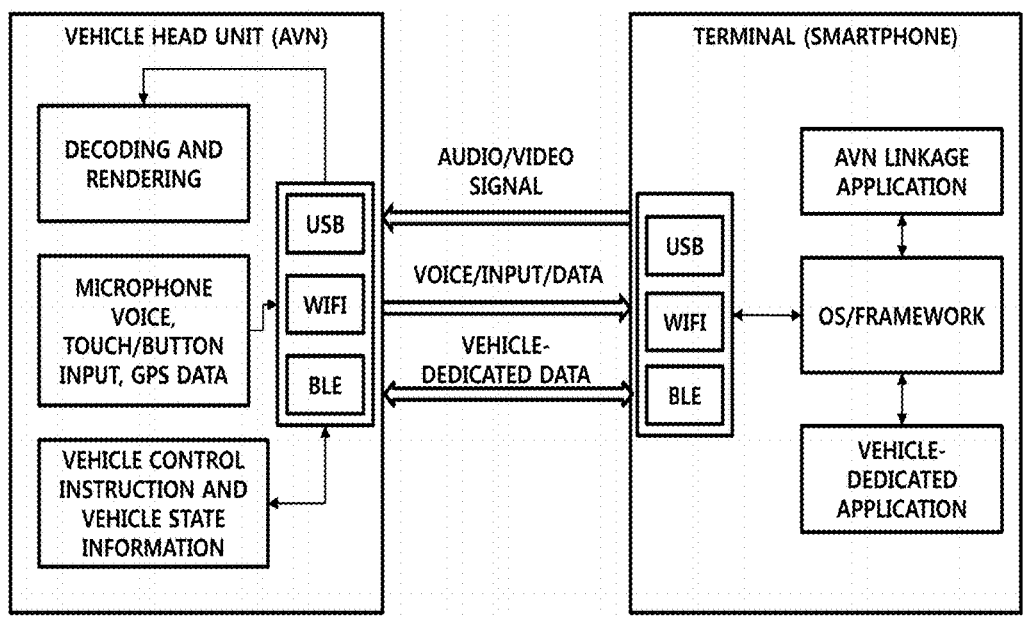
FIG. 1 is a block diagram for description of a configuration of a system for linking a smartphone and a vehicle AVN system according to the related art.

Reference will now be made in detail to an apparatus and various methods to which the preferred embodiments of the present disclosure are applied. The suffixes "module" and "unit" of elements herein are used for convenience of description and thus can be used interchangeably and do not have any distinguishable meanings or functions.

Although all elements constituting the embodiments of the present disclosure are described as being integrated into a single one or operated as a single one, the present disclosure is not necessarily limited to such embodiments. According to embodiments, all of the elements may be selectively integrated into one or more and be operated as one or more within the object and scope of the present invention. Each of the elements may be implemented as independent hardware. Alternatively, some or all of the elements may be selectively combined into a computer program having a program module performing some or all functions combined in one or more pieces of hardware. Code and code segments constituting the computer program may be easily reasoned by those skilled in the art to which the present disclosure pertains. The computer program may be stored in computer readable media such that the computer program is read and executed by a computer to implement embodiments of the present disclosure. Computer program storage media may include magnetic recording media, optical recording media, and carrier wave media.

The terms "comprises", "includes", and "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings in the related art from the context. Unless obviously defined in the present disclosure, such terms should not be interpreted as having ideal or excessively formal meanings.

It will be understood that, although the terms first, second, A, B, (a), (b), etc. may be used herein to describe various elements of the present disclosure, these terms are only used to distinguish one element from another element and essence, order, or sequence of corresponding elements are not limited by these terms. It will be understood that when one element is referred to as "connected to", "coupled to", or "accessing" another element, one element may be "connected to", "coupled to", or "access" another element via a further element although one element may be directly connected to or directly access another element.

In description below, a vehicle head unit may have an audio video navigation (AVN) function. Further, the vehicle head unit, a telematics multimedia unit (TMU), an AVN system, etc. are interchangeable.

In addition, an external terminal according to the present disclosure may include a smartphone. For convenience of description, the external terminal, a terminal, and the smartphone are interchangeable.

In addition, application software included in the smartphone or the vehicle head unit to transmit and receive information collected from a vehicle, vehicle security-related information, a vehicle control instruction, etc. is referred to as a vehicle-dedicated application or a vehicle information management application. On the other hand, application software included in the smartphone to use various multimedia functions included in the vehicle head unit is referred to as an AVN linkage application to be distinguished from the vehicle-dedicated application.

An external terminal according to an embodiment of the present disclosure may be connected to the vehicle head unit through a near field communication module or a mobile communication module. For example, the near field communication module may have a Bluetooth communication function, a Wi-Fi communication function, a ZigBee communication function, an ultra wideband (UWB) communication function, a radio frequency identification (RFID) communication function, etc. However, the disclosure is not limited thereto. In addition, the mobile communication module may provide at least one wireless access technology among 3rd generation partnership project (3GPP), wideband code division multiple access (WCDMA) defined in the 3GPP2 standard, high speed downlink/uplink packet access (HSDPA/HSUPA), long term evolution (LTE), LTE-advanced, CDMA 2000, and wireless access for vehicular environment (WAVE).

Further, an external terminal according to another embodiment may directly access a vehicle gateway. In this case, the external terminal and the vehicle gateway may perform wireless communication or wired communication. As an example, the external terminal and the vehicle gateway may be connected through a predetermined wired communication connector to perform communication. As another example, the external terminal and the vehicle gateway may include the above-described near field communication module and/or mobile communication module to perform communication. The vehicle gateway may detect access by the external terminal, and transmit a result of detection to a controller included in a vehicle. In addition, when an external terminal connected by the controller included in the vehicle is determined to be a hacking terminal, the vehicle gateway may block access by the external terminal to the vehicle and cancel established communication connection.

Figure 2:
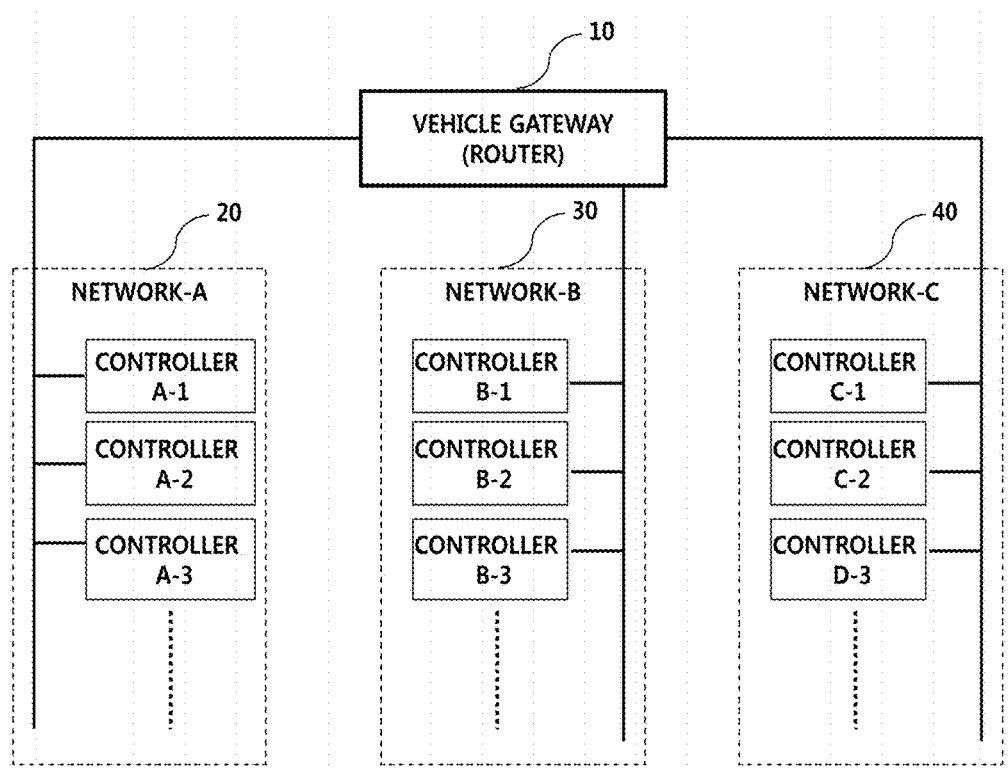
FIG. 2 is a block diagram illustrating an in-vehicle communication system according to an embodiment of the present disclosure.

FIG. 2 illustrates an in-vehicle communication system according to an embodiment of the present disclosure.

Referring to FIG. 2, the in-vehicle communication system may include a vehicle gateway (router) 10 that provides a routing function during communication between controllers installed in a vehicle, and network(s) which are connected to the vehicle gateway 10 and have various domains, for example, a network A 20, a network B 30, and a network C 40. Each network or domain may include at least one controller. Examples of the domain may include a body domain, a chassis domain, a driver assistance system domain, a power train domain, a surround view domain, a head unit domain, etc. However, the present disclosure is not limited thereto, and it should be noted that a name and a type of the domain may vary according to a vehicle manufacturer and a model.

In addition, a communication scheme between the vehicle gateway 10 and the network may vary according to domain, and the in-vehicle communication system may include a plurality of vehicle gateways. For example, controller area network (CAN) communication, local interconnect network (LIN) communication, FlexRay communication, Ethernet communication, etc. are applicable to the in-vehicle communication system. However, the present disclosure is not limited thereto.

An external terminal that has an application for collecting vehicle information and controlling a vehicle according to an embodiment of the present disclosure may access the vehicle gateway 10 through a vehicle head unit connected by an in-vehicle communication network to communicate with a vehicle controller.

An external terminal that has an application for collecting vehicle information and controlling a vehicle according to another embodiment of the present disclosure may directly access the vehicle gateway 10 to communicate with the vehicle controller.

The vehicle head unit or the vehicle gateway 10 according to the present embodiment may include at least one communication means among a near field communication module, a mobile communication module, and a wired communication module to perform communication connection with the external terminal.

Hereinafter, description will be given using CAN communication as an example in which the network connected to the vehicle gateway 10 performs broadcast communication.

The vehicle gateway 10 according to the present embodiment may generate new identifications (IDs) for the controllers included in all the networks 20, 30 and 40 connected thereto each time the vehicle is started, and update a routing table using the generated new IDs. Here, each of the new IDs may correspond to information for uniquely identifying a corresponding controller in the vehicle, the gateway 10 or a corresponding network. For example, in CAN communication, the new ID may be transmitted in an output message of each controller. Each controller may identify a controller, from which a message can be received, using a new ID included in the received message. To this end, each controller may maintain ID information of controllers, from which messages are allowed to be received, that is, a list of receivable IDs. When a controller receives a message excluding an ID of another controller, from which a message is allowed to be received, the controller may discard the received message from the other controller.

In general, a CAN communication bus does not include a master that controls all nodes when each node, that is, an electronic control unit (ECU) or a controller accesses data on the CAN bus to perform a read or write operation. Therefore, when each node is prepared to transmit data, each node may transmit a CAN frame to the network after verifying whether a CAN bus line is in use. In this instance, the transmitted CAN frame neither includes an address of a transmission node nor an address of a reception node. Instead, an ID for uniquely identifying the controller that transmits the CAN frame is transmitted in the CAN frame.

When the respective nodes attempt to simultaneously transmit messages on the CAN bus, a node having top priority, for example, a node having a lowest arbitration ID may automatically access the bus. Currently, an arbitration ID used in CAN communication has a length of 11 bits (CAN 2.0 Part A) or 29 bits (CAN 2.0 Part B).

In other words, the ID of the CAN frame may be used to identify content of a message and to identify a priority of the message. For example, an allocation range of a controller ID may be 0x000h to 0x7ffh or 0x000h to 0x6ffh in an application message, and may be 0x700h to 0x7ffh in a diagnostic message. However, the present disclosure is not limited thereto, and it should be noted that the allocation range may vary according to length of an arbitration ID field and/or vehicle manufacturer and model.

Controllers included in an in-vehicle network, that is, ECUs may be installed in an engine management system (EMS), a telecommunication control unit (TCU), a hybrid control unit (HCU), a battery management system (BMS), electronic power steering (EPS), motor driven power steering (MDPS), a lane keeping assist system (LKAS), smart cruise control (SCC), a tire pressure management system (TPMS), etc. and connected to each other through CAN communication.

Figure 3:
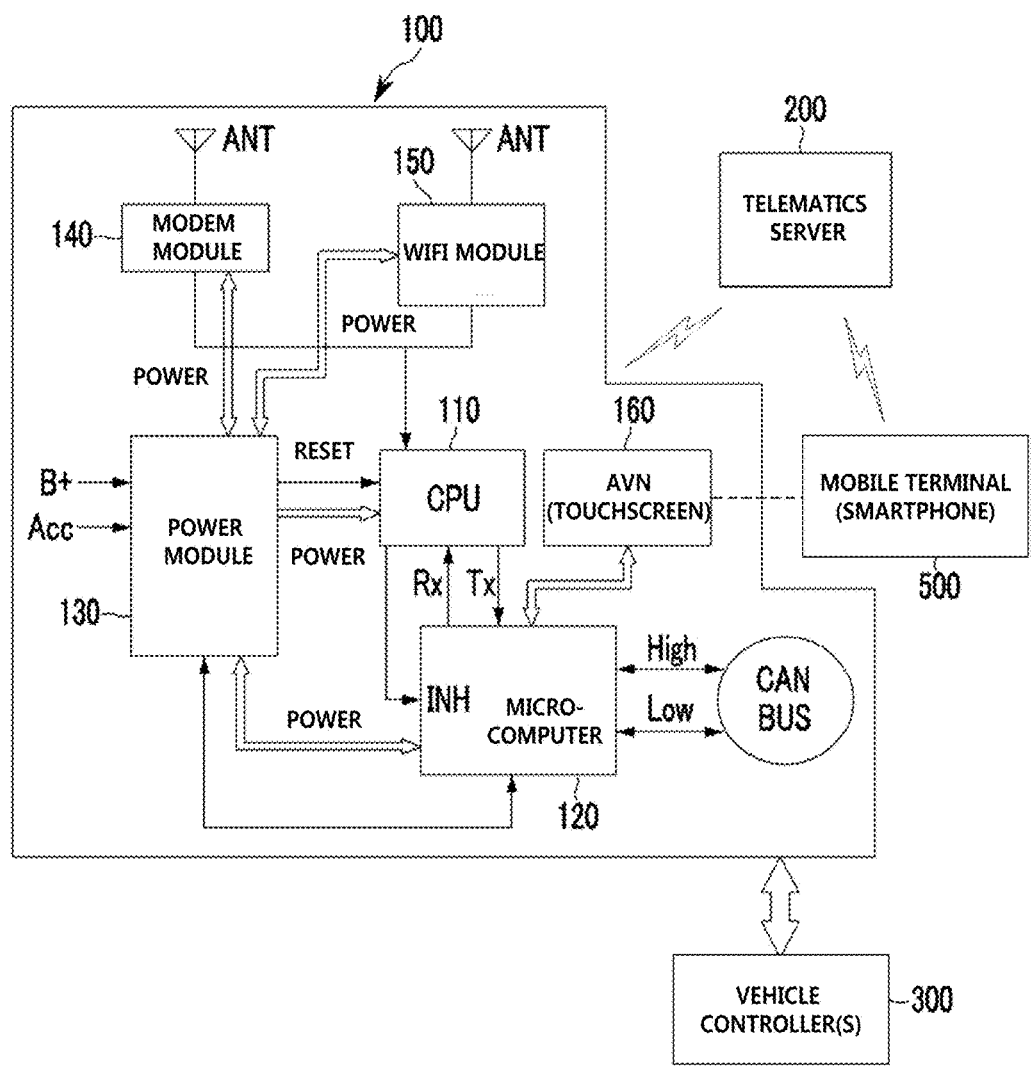
FIG. 3 is a block diagram schematically illustrating a system for interrupting external hacking into a telematics remote-control vehicle according to an embodiment of the present disclosure.

FIG. 3 schematically illustrates a system for interrupting external hacking into a telematics remote-control vehicle according to an embodiment of the present disclosure.

The system for interrupting external hacking into the telematics remote-control vehicle according to the present embodiment is a system for interrupting an external third party when the third party arbitrarily controls a vehicle including a telematics multimedia unit (TMU) through near field communication and a wireless communication network.

The system for interrupting external hacking into the telematics remote-control vehicle according to the present embodiment may include a telematics server 200 for managing information and data related to vehicle remote control, a TMU 100 installed in the vehicle to communicate with the telematics server 200, and a plurality of vehicle controllers 300 installed in the vehicle and connected to the TMU 100 through a CAN communication network to control devices. In this instance, the vehicle controllers 300 may communicate with the TMU 100 through a vehicle gateway.

The TMU 100 according to the present disclosure may be included in a vehicle head unit having an audio/video/navigation function. However, the present disclosure is not limited thereto, and the TMU 100 may be configured as a separate device and included in the vehicle.

Here, the telematics server 200 may correspond to a server installed in an existing telematics center.

The vehicle controllers 300 may be installed in the EMS, the TCU, the HCU, the BMS, the EPS, the MDPS, the LKAS, the SCC, and the TPMS described above with reference to FIG. 2.

The TMU 100 may include a modem module 140, a Wi-Fi module 150, a power module 130, a central processing unit (CPU) 110, a microcomputer 120, a touchscreen 160, etc.

The modem module 140 may provide at least one wireless access technology among 3GPP, WCDMA defined in the 3GPP2 standard, HSDPA/HSUPA, LTE, LTE-advanced, CDMA 2000, and WAVE.

The CPU 110 and the microcomputer 120 operate by a program installed in a microprocessor. Here, the installed program may include program code for providing a security function to an EMS when the TMU according to the present embodiment is linked with an external terminal 500 in addition to program code for executing an existing telematics function and AVN function.

Software installed in the CPU 110 may be remotely updated through the telematics server 200. On the other hand, software installed in the microcomputer 120 may be programmed through a diagnostor connected to the vehicle rather than an external wireless network. However, the present disclosure is not limited thereto.

Figure 4:
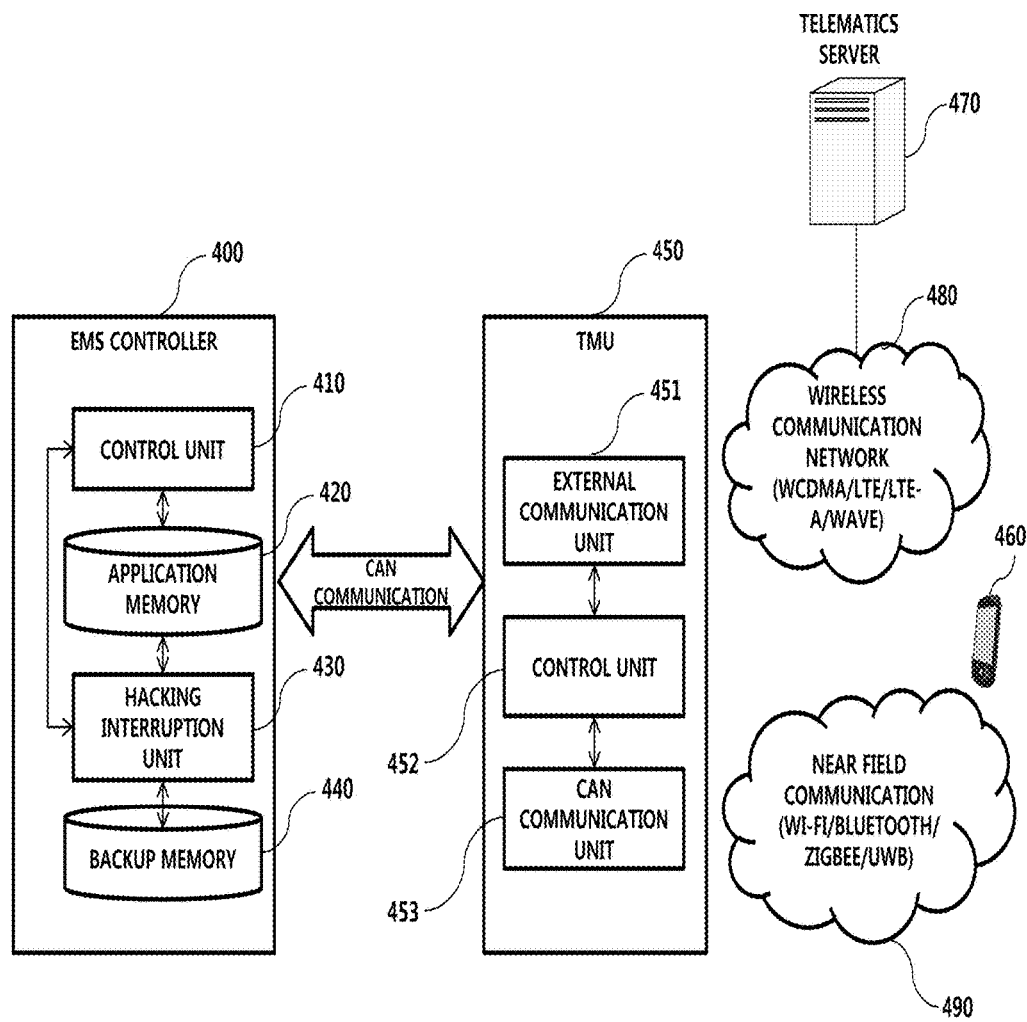
FIG. 4 is a block diagram illustrating a method of interrupting hacking into an engine management system (EMS) according to an embodiment of the present disclosure.

FIG. 4 illustrates a method of interrupting hacking into an EMS according to an embodiment of the present disclosure.

Referring to FIG. 4, a controller 400 installed in the EMS may broadly include a control unit 410, an application memory 420, a hacking interruption unit 430, and a backup memory 440.

The control unit 410 may control overall operation and input/output of the EMS controller 400. For example, when an external terminal 460 accesses a TMU 450, and thus a vehicle-dedicated application is executed, the control unit 410 may receive a predetermined terminal access notification signal that reports access by the external terminal 460 from the TMU 450 through CAN communication. In this instance, the control unit 410 may send out a predetermined control signal that instructs start of a hacking interruption function to the hacking interruption unit 430 to perform a control operation such that the hacking interruption unit 430 performs the hacking interruption function on the connected external terminal 460.

The hacking interruption unit 430 may compare information recorded in the application memory 420 with information stored in the backup memory 440 to detect whether hacking occurs. When hacking is detected, the hacking interruption unit 430 may deliver a predetermined hacking detection signal to the control unit 410, and the control unit 410 may transmit a hacking warning message to the TMU 450 through CAN communication.

Upon receiving the hacking warning message, the TMU 450 may interrupt wireless access to the external terminal 460. For example, when the external terminal 460 is connected through a wireless communication network 480, the TMU 450 may cancel an established wireless communication channel. When the external terminal 460 is connected through near field communication 490, the TMU 450 may cancel an established near field communication channel.

In addition, upon receiving the hacking warning message, the TMU 450 may transmit information about the external terminal 460 attempting hacking to a telematics server 470. Here, the information about the external terminal 460 may include terminal identification information such as phone number information, Internet protocol (IP) address information, media access control (MAC) address information, etc. allocated to the external terminal 460.

The TMU 450 may include a control unit 452 for controlling overall operation and input/output, an external communication unit 451 for wirelessly communicating with the external terminal 460 and the telematics server 470, and a CAN communication unit 453 performing CAN communication with controllers included in a vehicle.

When the vehicle is started, the EMS controller 400 may copy information stored in the backup memory 440 and record the copied information in the application memory 420. As another example, when a predetermined message reporting access by an external terminal is received from the TMU 450, the EMS controller 400 may copy fixed data recorded in the application memory 420 and record the copied data in the backup memory 440. Here, the fixed data may include at least one of fixed calibration data and fixed CAN communication data to be described below.

The backup memory 440 is a secure area which cannot be directly accessed by the control unit 410, and is accessible only through a diagnostor validated in a management mode. For example, information stored in the backup memory 440 may include fixed data information of fields included in a CAN communication message (hereinafter referred to as fixed CAN communication data for convenience of description) in addition to various types of fixed calibration data for calibration in an engine control system.

On the other hand, the application memory 420 is a memory area changeable by an application during operation of the EMS controller 400, and may be a memory area accessible and changeable by the control unit 410. In this instance, it should be noted that the control unit 410 cannot access the backup memory 440.

In response to start of the vehicle, the hacking interruption unit 430 may copy information stored in the backup memory 440 and record the copied information in the application memory 420.

For example, the fixed calibration data may include torque-related calibration parameter setting information, idle revolutions per minute (RPM) mapping table information, accelerator pedal sensor (APS) setting table information, brake pedal sensor (BPS) setting table information, etc. However, the present disclosure is not limited thereto.

The fixed calibration data is data verified by a vehicle manufacturer through various tests before releasing the vehicle, and may correspond to data or a parameter not changed during driving. As an example, the APS setting table information is information about a fuel level to be supplied to an engine in comparison with a pressure applied to an accelerator pedal, and the information is essential for safe driving, and thus should not be changed. As another example, the BPS setting table information is information about braking power applied to a driving device in comparison with a pressure applied to a brake pedal, and the information is essential to safe driving, and thus should not be changed.

The hacking interruption unit 430 according to the present embodiment may detect whether hacking occurs by monitoring whether the fixed calibration data stored in the backup memory 440 is changed in the application memory 420 in real time. In other words, when the external terminal 460 accessing the TMU 450 attempts to change the fixed calibration data stored in the application memory 420 of the EMS controller 400, the hacking interruption unit 430 may detect and report the attempt to the control unit 410.

The fixed CAN communication data may correspond to fixed information, in which content is not changed, in a CAN message. For example, the fixed CAN communication data may correspond to CAN message information predefined by a vehicle manufacturer, and include a particular field value of a particular CAN message or a whole CAN message not changed during driving.

For example, a signaling message for a learning configuration is a CAN message not changed in the vehicle during driving. Therefore, when the signaling message for the learning configuration is received through CAN communication, the hacking interruption unit 430 may detect whether hacking occurs by verifying whether the message is falsified.

According to another embodiment of the present disclosure, the hacking interruption unit 430 may monitor the application memory 420 in real time, and recover changed fixed calibration data and/or fixed CAN communication data with reference to the backup memory 440 when change of the fixed calibration data and/or fixed CAN communication data is confirmed. Therefore, the hacking interruption unit 430 may interrupt an attempt by the external terminal 460 to hack into the EMS through illegal change of a memory and illegal falsification of a CAN message, thereby ensuring safe driving.

In addition, according to another embodiment of the present disclosure, the hacking interruption unit 430 may increase a predetermined hacking detection counter each time when the fixed calibration data and/or the fixed CAN communication data in the application memory 420 are inconsistent with the fixed calibration data and/or the fixed CAN communication data in the backup memory 440. When the detection counter reaches a predetermined threshold value, the hacking interruption unit 430 may transmit a control signal reporting that hacking occurs to the control unit 410. Subsequently, the control unit 410 may transmit the control signal reporting that hacking occurs to the TMU 450 through CAN communication. Thereafter, the TMU 450 may cancel the communication channel established with the external terminal 460, and interrupt access by the external terminal 460 until additional security authentication is completed.

In the above description with reference to FIG. 4, the external terminal 460 accesses the vehicle through the TMU 450 to control the controller included in the vehicle. However, this is merely an example. According to another embodiment of the present disclosure, the external terminal 460 may access the vehicle through a vehicle gateway. In this case, when the external terminal 460 accesses the vehicle gateway and a vehicle-dedicated application is executed, the control unit 410 may receive a predetermined terminal access notification signal that reports access by the external terminal 460 from the vehicle gateway through CAN communication. In this instance, the control unit 410 may send out the predetermined control signal instructing start of the hacking interruption function to the hacking interruption unit 430 to perform the control operation such that the hacking interruption unit 430 performs the hacking interruption function on the connected external terminal 460. In addition, upon receiving a predetermined control signal indicating that hacking is detected from a vehicle controller, the vehicle gateway may interrupt access by the external terminal 460 to the vehicle and cancel the established communication channel.

FIG. 5 is a diagram for description of a method of detecting hacking through comparison between memories in a hacking interruption unit of an EMS controller according to an embodiment of the present disclosure.

Referring to FIG. 5, when access by an external terminal is confirmed, the hacking interruption unit may read fixed calibration data 511 and 512 recorded in a backup memory 510 and fixed calibration data 521 and 522 recorded in an application memory 520 at predetermined intervals, for example, every 50 ms to 100 ms to verify whether the fixed calibration data is consistent. When the fixed calibration data read from the application memory 520 is inconsistent with the fixed calibration data read from the backup memory 510 (for example, refer to reference numerals 511 and 521), the hacking interruption unit may increment a value of a predetermined hacking counter 513 recorded in the backup memory 510. When the hacking counter value reaches a predetermined threshold value, for example, 3 to 5, the hacking interruption unit may determine that hacking has occurred.

In the above description with reference to FIGS. 2 to 5, the fixed calibration data and the fixed CAN communication data are retained before the external terminal accesses the TMU. However, this is merely an example. According to another embodiment, the EMS controller may copy the fixed calibration data and the fixed CAN communication data recorded in the application memory to the backup memory upon receiving a predetermined external terminal access notification message reporting access by the external terminal from the TMU.

Hereinafter, a detailed description will be given of a method of providing EMS security when an external terminal is linked with a TMU with reference to FIG. 6.

Figure 6:
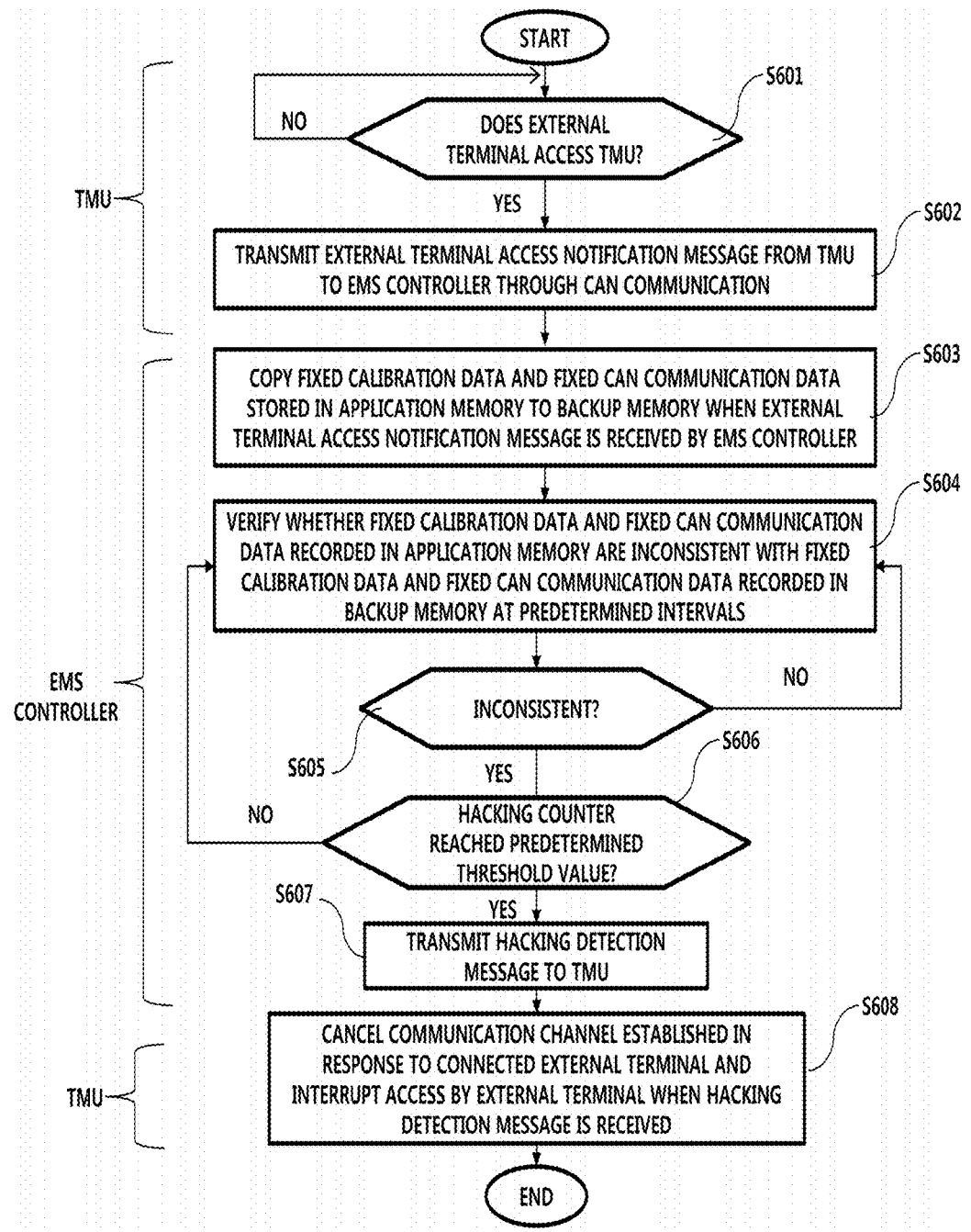
FIG. 6 is a flowchart illustrating a method of providing EMS security when an external terminal is linked with a TMU according to an embodiment of the present disclosure.

FIG. 6 illustrates a method of providing EMS security when an external terminal is linked with a TMU according to an embodiment of the present disclosure.

In S601 and S602, the TMU may transmit a predetermined external terminal access notification message to an EMS controller through CAN communication when the external terminal accesses the TMU.

In S603, the EMS controller may copy fixed calibration data and fixed CAN communication data stored in an application memory into a backup memory when the external terminal access notification message is received.

In S604, the EMS controller may verify whether the fixed calibration data and the fixed CAN communication data recorded in the application memory are consistent with the fixed calibration data and the fixed CAN communication data recorded in the backup memory at predetermined intervals.

When the fixed calibration data and the fixed CAN communication data recorded in the application memory are inconsistent with the fixed calibration data and the fixed CAN communication data recorded in the backup memory as a result of verification, the EMS controller may increment a hacking counter value stored in the backup memory by 1, and then verify whether the hacking counter value reaches a predetermined threshold value in S605 and S606.

When the hacking counter value reaches the predetermined threshold value as a result of verification, the EMS controller may transmit a predetermined hacking detection message to the TMU through CAN communication in S607.

When the hacking detection message is received from the EMS controller, the TMU may cancel a communication channel established in response to the connected external terminal, and interrupt access by the external terminal until user authentication for the external terminal is completed thereafter in S608. Here, user authentication for the external terminal may be performed by a telematics server, and the telematics server may transmit a predetermined control message requesting release of interruption of access by the external terminal to the TMU when the user authentication for the external terminal is successfully performed.

In the above description with reference to FIGS. 2 to 6, a detailed description is given of a method of preventing hacking into an EMS. However, this is merely an example, and it should be noted that other systems and controllers included in the vehicle may have a logic for determining whether hacking occurs by comparing the fixed calibration data and the fixed CAN communication data stored in the application memory with the fixed calibration data and the fixed CAN communication data stored in the backup memory in response to access by the external terminal. Here, examples of the other systems and controllers may include a TCU, HCU, BMS, EPS, MDPS, LKAS, SCC, and a TPMS. However, the present disclosure is not limited thereto, and it should be noted that the present disclosure is applicable to all controllers in the vehicle in which the fixed calibration data and the fixed CAN communication data are used.

Effects of the method and apparatus according to the present disclosure are described below.

The present disclosure has an advantage of providing a method of preventing drive-by hacking when an external terminal accesses a vehicle head unit, and an apparatus and system therefor.

In addition, the present disclosure has an advantage of providing a method and apparatus for preventing hacking into an EMS when an external terminal is linked with a vehicle head unit. Here, the method and apparatus may detect whether hacking into the EMS occurs by periodically comparing fixed calibration data recorded in an application memory area used by an application layer of an EMS controller with fixed calibration data recorded in a backup memory area inaccessible by the external terminal when the external terminal is linked with the vehicle head unit.

In addition, the present disclosure has an advantage of providing a method and apparatus for preventing hacking into an EMS when an external terminal is linked with a vehicle head unit. Here, the method and apparatus may detect whether hacking into the EMS occurs by comparing a communication message received by an application layer of an EMS controller with standard information of a particular field value of the message retained in a backup memory area in real time when the external terminal is linked with the vehicle head unit.

In addition, the present disclosure has an advantage of providing a method and apparatus for providing EMS security capable of interrupting illegal operation of and access to an EMS memory through an external terminal linked with a vehicle head unit in real time.

In addition, the present disclosure has an advantage of providing a method and apparatus for providing EMS security capable of detecting whether hacking is attempted by monitoring a value recorded at a particular address of an EMS application memory and a value of a particular field of a received CAN frame in real time.

In addition, the present disclosure is effective in enhancing reliability of a vehicle by preventing hacking into a vehicle in advance using the above-described advantages.

Effects that may be obtained from the present disclosure are not limited to the above-mentioned effects, and other effects not mentioned herein may be clearly understood by those skilled in the art from the above description.

Those skilled in the art will appreciate that the present disclosure may be carried out in other specific ways than those set forth herein without departing from the spirit and essential characteristics of the present disclosure.

The above exemplary embodiments are therefore to be construed in all aspects as illustrative and not restrictive. The scope of the disclosure should be determined by the appended claims and legal equivalents thereof, not by the above description, and all changes coming within the meaning and equivalency range of the appended claims are to be embraced therein.

What is claimed is:

1. A method of preventing drive-by hacking in a vehicle system linked with a vehicle head unit through a communication network in a vehicle, comprising steps of:
receiving a predetermined external terminal access notification message reporting access by an external terminal from the vehicle head unit;
copying fixed data recorded in an application memory to a backup memory;
verifying whether the fixed data recorded in the application memory is consistent with the fixed data recorded in the backup memory at predetermined intervals; and
transmitting a predetermined hacking detection message to the vehicle head unit based on a result of verification,
wherein the hacking detection message is transmitted to the vehicle head unit when the fixed data recorded in the application memory is inconsistent with the fixed data recorded in the backup memory a number of times reaching a predetermined threshold value.

2. The method according to claim 1, wherein the fixed data includes at least one of fixed calibration data and fixed controller area network (CAN) communication data.

3. The method according to claim 2, wherein the fixed calibration data includes at least one of torque-related calibration parameter setting information, idle revolutions per minute (RPM) mapping table information, accelerator pedal sensor (APS) setting table information, and brake pedal sensor (BPS) setting table information.

4. The method according to claim 1, further comprising a step of canceling a communication channel established between the external terminal and the vehicle when the hacking detection message is transmitted to the vehicle head unit.

5. The method according to claim 1, wherein the communication network in the vehicle corresponds to one of a CAN communication network, a local interconnect network (LIN) communication network, a FlexRay communication network, and an Ethernet communication network.

6. The method according to claim 1, wherein the vehicle system corresponds to one of an engine management system (EMS), a telecommunication control unit (TCU), a hybrid control unit (HCU), a battery management system (BMS), electronic power steering (EPS), motor driven power steering (MDPS), a lane keeping assist system (LKAS), smart cruise control (SCC), and a tire pressure management system (TPMS).

7. A method of preventing drive-by hacking in a vehicle system linked with a vehicle gateway through a communication network in a vehicle, comprising:

receiving a predetermined external terminal access notification message reporting access by an external terminal from the vehicle gateway;

copying fixed data recorded in an application memory to a backup memory;

verifying whether the fixed data recorded in the application memory is consistent with the fixed data recorded in the backup memory at predetermined intervals; and transmitting a predetermined hacking detection message to the vehicle gateway based on a result of verification, wherein the hacking detection message is transmitted to the vehicle gateway when the fixed data recorded in the application memory is inconsistent with the fixed data recorded in the backup memory a number of times reaching a predetermined threshold value.

8. An apparatus for preventing drive-by hacking linked with an external terminal through a communication network in a vehicle, comprising:

a control unit for receiving a predetermined external terminal access notification message reporting access by an external terminal;

an application memory wherein fixed data processed by the control unit is recorded;

a backup memory wherein a copy of the fixed data is recorded, access by the control unit to the backup memory being interrupted; and a hacking interruption unit for verifying whether the fixed data recorded in the application memory is consistent with the fixed data recorded in the backup memory, wherein the control unit performs a control operation such that communication with the external terminal is interrupted when hacking is detected based on a result of verification, wherein the hacking interruption unit copies the fixed data recorded in the application memory to the backup memory according to control of the control unit, and verifies whether the fixed data recorded in the application memory is consistent with the fixed data recorded in the backup memory at predetermined intervals, wherein the hacking interruption unit determines that hacking occurs and transmits a predetermined hacking detection message to the control unit when the fixed data recorded in the application memory is inconsistent with the fixed data recorded in the backup memory a number of times reaching a predetermined threshold value.

9. The apparatus according to claim 8, wherein the control unit transmits the received hacking detection message to a vehicle head unit or a vehicle gateway connected to the external terminal, wherein the vehicle head unit or the vehicle gateway cancels a communication channel established with the external terminal when the hacking detection message is received.

10. The apparatus according to claim 8, wherein the fixed data includes at least one of fixed calibration data and fixed CAN communication data.

11. The apparatus according to claim 10, wherein the fixed calibration data includes at least one of torque-related calibration parameter setting information, idle RPM mapping table information, APS setting table information, and BPS setting table information.

12. The apparatus according to claim 8, wherein the communication network in the vehicle corresponds to one of a CAN communication network, a LIN communication network, a FlexRay communication network, and an Ethernet communication network.

13. The apparatus according to claim 8, wherein the apparatus for preventing drive-by hacking is installed in one of an EMS, a TCU, an HCU, a BMS, an EPS, an MDPS, an LKAS, an SCC, and a TPMS.

14. A system for preventing drive-by hacking comprising:

a vehicle head unit for transmitting a predetermined external terminal access notification message reporting access by an external terminal through a CAN communication network in response to the access by the external terminal; and a vehicle controller for copying fixed data recorded in an application memory to a backup memory when the external terminal access notification message is received, and transmitting a predetermined hacking detection message to the vehicle head unit when hacking is detected by verifying that the fixed data recorded in the application memory is inconsistent with the fixed data in the backup memory at predetermined intervals, wherein the vehicle head unit cancels a communication channel established with the external terminal when the hacking detection message is received, wherein the hacking detection message is transmitted to the vehicle head unit when the fixed data recorded in the application memory is inconsistent with the fixed data recorded in the backup memory a number of times reaching a predetermined threshold value.

15. The system according to claim 14, wherein the fixed data includes at least one of fixed calibration data and fixed CAN communication data.

16. The system according to claim 15, wherein the fixed calibration data includes at least one of torque-related calibration parameter setting information, idle RPM mapping table information, APS setting table information, and BPS setting table information.

17. The system according to claim 14, wherein the vehicle controller is installed in one of an EMS, a TCU, an HCU, a BMS, an EPS, an MDPS, an LKAS, an SCC, and a TPMS.

18. A non-transitory computer-readable recording medium recording a program for executing a method of preventing drive-by hacking in a vehicle system linked with a vehicle head unit through a communication network in a vehicle, wherein the method comprises steps of:

receiving a predetermined external terminal access notification message reporting access by an external terminal from the vehicle head unit;

copying fixed data recorded in an application memory to a backup memory;

verifying whether the fixed data recorded in the application memory is consistent with the fixed data recorded in the backup memory at predetermined intervals; and transmitting a predetermined hacking detection message to the vehicle head unit based on a result of verification, wherein the hacking detection message is transmitted to the vehicle head unit when the fixed data recorded in the application memory is inconsistent with the fixed data recorded in the backup memory a number of times reaching a predetermined threshold value.

* * * * *